United States Patent Office 2,942,579
Patented June 28, 1960

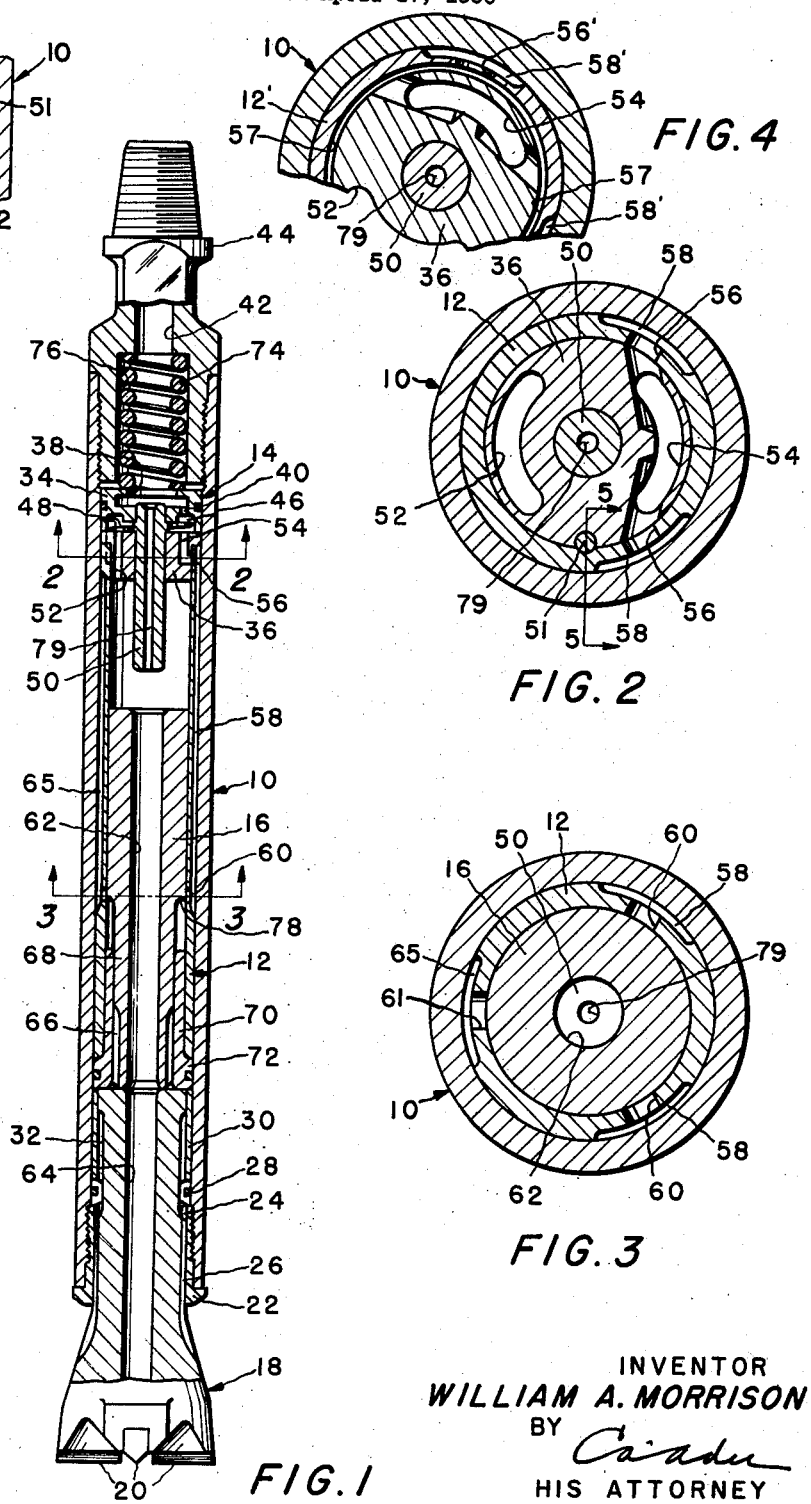

2,942,579
ROCK DRILL

William A. Morrison, Easton, Pa., assignor to Ingersoll-Rand Company, New York, N.Y., a corporation of New Jersey Filed Apr. 17, 1956, Ser. No. 578,640

12 Claims. (Cl. 121—16)

This invention relates to rock drills, and more particularly to pneumatically operated percussive drills of the type adapted to be inserted into the hole being drilled thereby and are commonly known as "down-the-hole" drills.

In drills of this type, one disadvantage is that the outer casing is constantly subjected to an abrading action resulting from the casing rubbing against the surface of the drill hole and from rock cuttings blown or washed past the drill in the process of cleansing the drill hole. This action causes excessive wear of the casing thereby requiring frequent repair or renewal.

It is one object of this invention to provide such a drill with a relatively inexpensive casing constructed of conventional tubing material.

Another object is to provide a casing which is substantially smooth and of uniform diameter throughout its entire length.

A further object is to provide a drill of this type in which the parts of the drill are readily removed from the casing and reassembled in a new casing.

A still further object is to provide a drill of this type in which the longitudinal fluid passages for conducting pressure fluid for operating the drill piston are formed in the shape of grooves in the surface of the drill parts.

Other objects will become obvious from the following specification and drawings in which, Fig. 1 is a longitudinal sectional elevation of a preferred form of the drill, Figs. 2 and 3 are cross sectional views of Fig. 1 taken along the lines 2—2 and 3—3, respectively, looking in the direction of the arrows, Fig. 4 is a cross section showing a modified construction for the drill valve, and Fig. 5 is a partial cross section of Fig. 2 taken along the line 5—5 looking in the direction of the arrows.

Referring to the drawings, the drill shown comprises, in general, a tubular casing 10 housing a sleeve 12 and valve 14 slidably mounted therein and constantly urged against substantial longitudinal movement relative to the casing 10 by retainers at the opposite ends of the casing 10. The sleeve 12 is formed of a considerably harder material than the casing 10 to withstand the wear of a piston 16 reciprocated in the sleeve by pressure fluid valved alternately to the opposite ends of the piston by the valve 14. A working implement 18 is mounted at the forward end of the drill casing 10 with an end positioned to be actuated by the piston 16, as shown the piston 16 strikes directly on the working implement.

Referring now in greater detail to the construction of the drill, the working implement 18, shown in the form of a bit, includes a head having cutters 20 arranged to cut a hole of slightly greater diameter than the diameter of the casing 10 such that the drill casing may be lowered into the hole being drilled. The working implement is retained in the casing 10 and engaged for rotation therewith by means of a chuck. The chuck includes an end member 22 threaded in the end of the casing 10 and having internal straight longitudinally disposed splines 24 slidably interlockingly engaged in complementary grooves 26 in the shank of the working implement 18. The chuck also includes a ring 28 clamped between the end member 22 and a sleeve 30, and extending into the groove 32 in the shank of the working implement for limiting the longitudinal movement of the working implement 18 relative to the casing 10.

The chuck part, or sleeve, 30 is split longitudinally (not shown) and has a tight spring fit in the casing 10. The purpose of this is that the sleeve 30 will hold the parts, such as the valve 14 and sleeve 12, in the casing when the chuck parts 22 and 28 are disconnected to remove the working implement 18 for repair or replacement. It is to be understood that on removal of the member 22, the spring 74, described hereinafter, will move such parts somewhat but that the spring will not extend sufficiently to eject the member 22 from the casing 10.

The valve 14, shown by way of illustration only, includes a two piece cage 34 and 36 slidably fitted in the casing 10. The upper portion 34 of the cage is roughly tubular in shape and is provided with ports 38 and 40 for the passage of pressure fluid to the valve chamber 46 from the fluid supply passage 42 in the cylindrically shaped backhead 44. The flow of pressure fluid from the valve chamber 46 for actuating the piston 16 is controlled by means of a conventional flapper type valve 48 mounted for rocking movement about a central tube 50 mounted on the upper or rearward end of the roughly tubular shaped valve cage piece 36. The cage piece 36 has a reduced portion slidably fitted in the sleeve 12 and a flange abutting the end of the sleeve 12.

In furtherance to this end a port 52 is formed in the valve piece 36 leading from the chamber 46 to the rearward end portion of the interior of the sleeve 12 and is positioned to be covered by the flapper valve 48 when rocked in the position shown in the drawing. Positioned on the opposite side of the cage piece 36 is a port 54 arranged to be covered by the flapper valve 48 when rocked into its opposite position. Port 54 is communicated through a port 56, longitudinal passage 58 and port 60, all formed in the sleeve 12, with the forward end portion of the interior of the sleeve 12.

The valve piece 36 is engaged against rotational movement relative to the sleeve 12 by means of a pin 51 which keys the piece 36 to the sleeve 12 to insure that the port 54 is at all times in alignment with the ports 56 in the sleeve 12. In the particular embodiment shown, two such longitudinal passages 58 are shown to insure an adequate supply of air for reversing the piston. Also shown is a passage 65 communicated through port 61 with the forward end only of the sleeve 12. This passage serves as a cushioning chamber for air trapped into the forward end of the sleeve during the working stroke of the piston. It is to be noted that each of the passages 58 is in the form of a groove located in the periphery of the sleeve 12, the inner surface of the tube casing 10 forming the other boundary of the passage. If desired, the entire periphery of the sleeve 12 may be reduced between the ports 56 and 60 to form a single passage therebetween.

In the modified form of the invention shown in Fig. 4, a groove 57 is formed completely around the inner periphery of the rearward end of the sleeve 12'. The purpose of this groove is to eliminate the necessity of maintaining the valve 14 in a rotationally fixed position relative to the sleeve. That is, if the valve rotates to a position with the port 54 out of alignment with the port 56', then fluid is conducted from the port 54 through the groove 57 and thence through the port 56' to the passage 58.

Pressure fluid may be exhausted from the opposite ends of the sleeve 12 in any conventional manner. The particular exhaust means shown utilizes the exhaust as a cleansing fluid for blowing drill cuttings free of the hole. In furtherance to this end, pressure fluid is exhausted from the rearward end of the sleeve through central bores 62 and 64 in the piston 16 and working implement 18, respectively, whenever the piston is at the forward end of its working stroke. Exhaust through these bores is cut off when the piston approaches the rearward end of its stroke by means of the tube 50 having a sliding fit in the bore 62.

At approximately the same time that the exhaust from the back end of the sleeve is cut off, the forward end of the cylinder is exhausted through grooves 66 in the reduced extension 68 of the piston 16 and thence through the bore 64 of the working implement. It is to be noted that with this type of piston construction, a tubular guide piece 70 is mounted at the forward end of the sleeve 12 and includes a flange 72 clamped between the sleeve 30 and the forward end of the sleeve 12. A sealing ring is mounted in the flange to limit the escape of pressure fluid leaking from the passage 58 between the sleeve 12 and casing 10.

In accordance with an object of the invention, all inner parts of the drill are held in position in the casing 10 by the chuck part 22 and the roughly tubular shaped backhead 44, both internally threaded in the casing 10. As shown the rear retainer includes a relatively heavy spring 74 mounted in a recess 76 in the backhead 44 and biased between the end surface of the recess 76 and the valve cage piece 34. In this way the cage is constantly urged into engagement with the rearward end of the sleeve 12, forcing the sleeve into contact at its forward end with the flange 72 which is restrained against forward longitudinal movement by abutting the sleeve 30, ring 28 and rearward end of the chuck and member 22. The spring serves as a shock absorber in transmitting shock from the working implement to the drill rod, not shown, connected to the backhead 44.

The spring 74 or similar element is highly desirable for extended life of the drill, but the drill will operate without such an element. To ensure that spring breakage will not affect the drill operation, the length of the casing and position of the backhead 44 is chosen such that there is a relatively small clearance between the rear surface of the valve 14 and the backhead. Thus if the spring 74 breaks the drill will continue to operate although there may be slight longitudinal movement of the valve 14 and sleeve 12 in the casing 10.

With this construction it is readily apparent that in the event of damage to the casing 10 a new casing may be substituted by merely unthreading the chuck member 22 and the backhead 44, sliding all parts out of the casing 10 and inserting them in their operative positions in a new casing made from conventional tubing merely cut to the approximate desired length and internally threaded at its opposite ends. In this regard it is to be noted that the casing 10 is symmetrical about its longitudinal center so that in the event of excessive wear at one end portion only, the inner parts and the chuck and backhead may be reversed and thereby shift the opposite end of the casing to the position exposed to the greater wear.

In operation, assuming the parts to be in the position shown in Fig. 1, air is conducted from the passage 42 to the valve 14 and thence through the port 54, passages 58 and ports 60 to the forward end of the sleeve 12. This fluid acting on the pressure surface 78 of the piston 16 actuates the piston rearwardly. When the piston 16 has moved a sufficiently great distance rearwardly to uncover the rearward ends of the grooves 66, pressure fluid is exhausted from the forward end of the sleeve 12 and the exhaust from the rearward end is cut off. The compressive action of the piston increases the pressure in the rearward portion of the sleeve sufficiently to throw the flapper valve 48 into its other limiting position cutting off the supply of pressure fluid to the forward end of the piston and supplying pressure fluid to the rearward end portion thereof. This reversal in supply, actuates the piston forwardly until the piston 16 moves clear of the tube 50 and cuts off the exhaust through the grooves 66. Accordingly the pressure behind the piston drops and the pressure in front of the piston increases, causing the valve to be thrown into the position shown in the drawing. Where desired a central bore 79 may be formed in the tube 50 to augment the supply of pressure fluid used for cleansing purposes.

I claim:

1. A down-the-hole drill adapted to be inserted in the hole drilled thereby, comprising, a tubular casing, a sleeve wholly contained in said casing and slidable therein, a piston reciprocable in the sleeve, a valve slidably mounted in the rearward end of the sleeve for valving fluid pressure to reciprocate said piston and adapted to be removed from said casing together with said sleeve and piston, a working implement extending into the forward end of the casing and having an end positioned to be actuated by the piston, said working implement having a working surface designed to drill a hole larger than the casing, retainers at the opposite ends of the casing for preventing substantial longitudinal movement of the sleeve relative to the casing, and means for the escape of exhaust fluid from the sleeve.

2. A drill comprising, a tubular casing, a sleeve wholly contained in the casing and slidable therein having a passage formed wholly in the periphery thereof for conducting pressure fluid to the forward end portion of the sleeve, a valve mounted at the rearward end of the sleeve for valving pressure fluid to reciprocate said piston, said valve having a port communicated with the rearward end portion of said sleeve and a port communicating with said passage, said valve controlling flow through said ports, a working implement extending into the forward end of the casing and having an end positioned to be actuated by the piston, retainers at the opposite ends of the casing for limiting longitudinal movement of the sleeve relative to the casing, and means for the escape of exhaust fluid from the sleeve.

3. A down-the-hole drill adapted to be inserted in the hole drilled thereby comprising, a circular casing, a sleeve wholly within the casing and slidable therein, a piston reciprocable in the sleeve, a valve mounted at the rearward end of the sleeve for valving fluid pressure to reciprocate said piston, a working implement extending into the forward end of the casing and having an end positioned to be actuated by the piston, said working implement having a working surface designed to drill a hole larger than the casing, retainers at the opposite ends of the casing for preventing substantial longitudinal movement of the sleeve relative to the casing, one of said retainers including a spring constantly urging the sleeve in the direction of the other of said retainers, and means for the escape of exhaust fluid from the sleeve.

4. The drill claimed in claim 1 in which one of said retainers is removably engaged to the casing.

5. The drill claimed in claim 1 in which one of said retainers includes means constantly urging the sleeve in the direction of the other of said retainers.

6. A drill adapted to be inserted in the hole drilled thereby comprising, a unitary tubular casing, a sleeve slidable in the casing, a piston reciprocable in the sleeve, passages in the drill for conducting pressure fluid to the interior of the opposite ends of the sleeve, a valve mounted at the rearward end of the sleeve for controlling the flow of such pressure fluid to reciprocate said piston, a working implement extending into the forward end of the casing and having an end positioned to be actuated by the piston, said implement having a cutting edge adapted to drill a hole larger than the diameter of the casing, chuck means for said implement engaged to one end of the casing for limiting forward longitudinal movement of said sleeve, a cap engaged to the rearward end of the casing, means for the escape of exhaust fluid from the sleeve, and spring means within the drill at the cap end thereof constantly urging said sleeve in the direction of the chuck for limiting the longitudinal movement of said valve and sleeve relative to the casing.

7. The drill claimed in claim 6 in which said chuck includes a part having a releasable positive engagement with said casing and cooperating to limit longitudinal movement of the working implement in a direction out of the casing, and a part having a spring fit in the casing and being positioned rearwardly of the first said part for holding the sleeve and valve in the casing when the first said part is disengaged from the casing.

8. A down-the-hole drill comprising, a unitary tubular casing of circular cross-section, a sleeve wholly within the casing and slidable therein, a piston reciprocable in the sleeve, a valve mounted at the rearward end of the sleeve for valving pressure fluid to the interior of the sleeve at opposite end portions thereof for reciprocating the piston, there being an opening through said sleeve at the forward end of said sleeve for pressure fluid, a fluid passage formed between the sleeve and the casing leading from said valve to said opening in the sleeve for conducting pressure fluid thereto, a working implement extending into the forward end of the casing and having an end positioned to be actuated by the piston, and means for limiting longitudinal movement of the sleeve and valve relative to said casing.

9. The drill claimed in claim 8 in which said passage is in the form of a groove in the outer periphery of said sleeve.

10. In a percussive type rock drill adapted to be inserted in the hole drilled thereby, comprising a tubular outer replaceable wear casing, a sleeve slidable within the casing, a piston reciprocable in the sleeve, a valve slidably mounted in the sleeve for supplying pressure fluid to actuate the piston, a working implement having an end extending into the forward end of the casing to be actuated by the piston, and means at the opposite ends of the casing for holding the sleeve in a relatively fixed longitudinal position within the casing, one of said means being removably engaged to the casing to permit removal of the sleeve by merely disengaging the last said means and sliding the sleeve from the casing.

11. A percussive tool comprising, a tubular outer replaceable wear casing, a sleeve slidable within the casing, a piston reciprocable in the sleeve, means in the casing for supplying pressure fluid to actuate the piston, said means including a passage within the drill leading from the rearward end of the drill to the forward interior portion of the sleeve, at least a portion of said passage being formed by a space between and defined by the casing and sleeve, a working implement having an end extending into the forward end of the casing to be actuated by the piston, and means at the opposite ends of the casing for holding the sleeve in a relatively fixed longitudinal position within the casing, one of said means being removably engaged to the casing to permit removal of the sleeve by merely disengaging the last said means and sliding the sleeve from the casing.

12. A percussive tool comprising, a tubular outer replaceable casing, a sleeve slidable within the casing, a piston reciprocable in the sleeve, means in the casing for supplying pressure fluid to actuate the piston, a working implement having an end extending into the forward end of the casing to be actuated by the piston, and retainers at the forward and rearward ends of the casing for holding the sleeve in a relatively fixed longitudinal position within the casing, said means including a valve slidable within the casing and held in position only by the rearward end portion of the sleeve and the rearward retainer of said retainers, one of said retainers being removably engaged to the casing to permit removal of the sleeve and valve by merely disengaging this retainer and sliding the valve and sleeve from the casing.

References Cited in the file of this patent

UNITED STATES PATENTS

| | | |
|---|---|---|
| 665,391 | Chapman | Jan. 1, 1901 |
| 803,621 | Patch | Nov. 7, 1905 |
| 910,560 | Mauss | Jan. 26, 1909 |
| 1,015,798 | Hastings | Jan. 30, 1912 |
| 1,436,512 | Mack | Nov. 21, 1922 |
| 1,978,118 | Stevens | Oct. 23, 1934 |
| 2,710,740 | Dempsey | June 14, 1955 |
| 2,756,966 | Bassinger | July 31, 1956 |
| 2,810,549 | Morrison | Oct. 22, 1957 |
| 2,837,317 | Hulshizer | June 3, 1958 |
| 2,851,251 | Mori | Sept. 9, 1958 |